United States Patent
Kawabata et al.

(10) Patent No.: US 6,661,469 B1
(45) Date of Patent: Dec. 9, 2003

(54) FALSE CONTOUR CORRECTING APPARATUS AND METHOD

(75) Inventors: Minoru Kawabata, Takatsuki (JP); Atsuhisa Kageyama, Ibaraki (JP); Masahiro Takeshima, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/581,644

(22) PCT Filed: Apr. 14, 1999

(86) PCT No.: PCT/JP99/01978

§ 371 (c)(1),
(2), (4) Date: Jun. 15, 2000

(87) PCT Pub. No.: WO99/55078

PCT Pub. Date: Oct. 28, 1999

(30) Foreign Application Priority Data

Apr. 17, 1998 (JP) .............................. 10/107584

(51) Int. Cl.[7] .............................. H04N 5/57; G09G 3/28; G06K 9/40
(52) U.S. Cl. .................. 348/607; 348/625; 348/606; 348/26; 345/63; 382/266
(58) Field of Search .................. 348/607, 615, 348/625, 627, 618, 26, 674, 606, 572; 345/63, 694, 695, 696; 382/266, 268, 269

(56) References Cited

U.S. PATENT DOCUMENTS

| | | | |
|---|---|---|---|
| 4,366,507 A | | 12/1982 | Mori |
| 5,192,996 A | * | 3/1993 | Sakashita et al. ............ 348/572 |
| 5,546,135 A | * | 8/1996 | Okamoto et al. ............ 348/674 |
| 5,668,606 A | | 9/1997 | Okamoto et al. |
| 5,715,000 A | | 2/1998 | Unamori |
| 5,966,461 A | * | 10/1999 | Harrington |
| 6,052,491 A | * | 4/2000 | Clatanoff et al. ............ 382/275 |
| 6,064,356 A | * | 5/2000 | Shigeta ......................... 345/63 |
| 6,091,396 A | * | 7/2000 | Minami et al. ............. 345/690 |

FOREIGN PATENT DOCUMENTS

| | | | |
|---|---|---|---|
| EP | 0 377 288 | 7/1990 | |
| EP | 0 389 044 A3 | 9/1990 | |
| EP | 0 389 044 A2 | 9/1990 | |
| EP | 0 788 087 | 8/1997 | |
| EP | 0 781 053 | 4/1999 | |
| EP | 0910061 A1 * | 4/1999 | ............. G09G/3/28 |
| EP | 1100259 A2 * | 5/2001 | ............. H04N/5/21 |
| EP | 1162571 A1 * | 12/2001 | ............. G06T/5/20 |
| JP | 6-62280 | 3/1994 | |

* cited by examiner

Primary Examiner—Michael H. Lee
Assistant Examiner—Paulos Nathael
(74) Attorney, Agent, or Firm—Wenderoth, Lind & Ponack, L.L.P.

(57) ABSTRACT

A false contour correcting apparatus is capable of removing a false contour in an image based on a digital image signal while avoiding such a side effect caused by false contour correction where noises negatively effecting the display occur on a screen. Therefore, in the false contour correcting apparatus according, a double bit change detection circuit detects as a double bit change a signal value change which is twice a minimum quantization unit in a digital image signal, and outputs a double bit change detection signal representing the position of the double bit change. A signal correction circuit corrects the double bit change in the digital image signal into two one-bit changes on the basis of the double bit change detection signal. Consequently, a false contour corresponding to a portion where the double bit change exists is removed.

10 Claims, 6 Drawing Sheets

F I G. 3
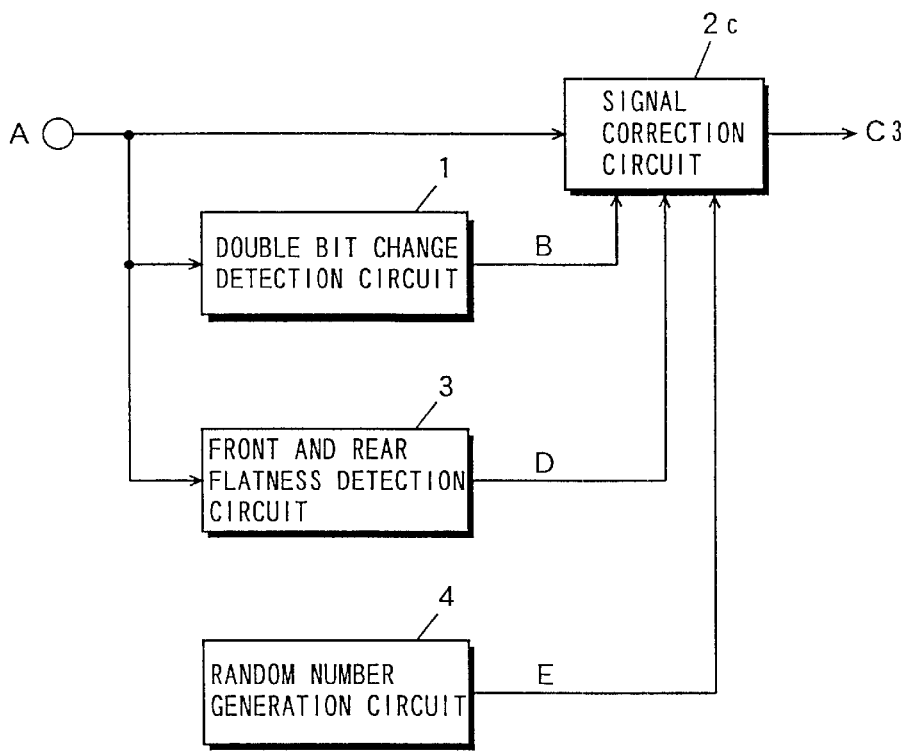
F I G. 4 A 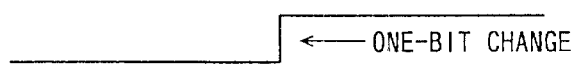 ←— ONE-BIT CHANGE
F I G. 4 B 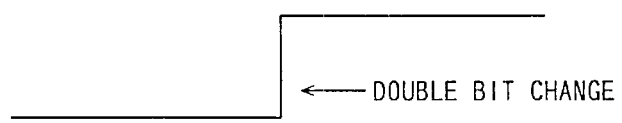 ←— DOUBLE BIT CHANGE
F I G. 4 C 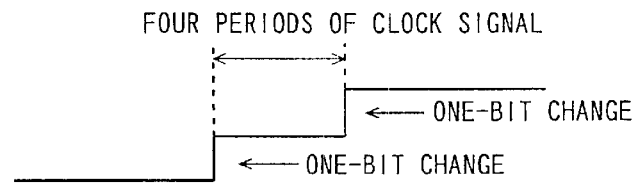

FALSE CONTOUR CORRECTING APPARATUS AND METHOD

TECHNICAL FIELD

The present invention relates to a false contour correcting apparatus and method used when an image signal is subjected to digital signal processing.

BACKGROUND ART

In recent years, as a television receiver or the like has increased in image quality and made multi-functional, an image signal has been frequently subjected to digital signal processing. For example, gray level correction has been made by the digital signal processing in order to increase the contrast of an image. When a quantized digital signal is subjected to such digital signal processing, an unnatural contour referred to as a false contour may, in some cases, be produced in an image displayed on a screen. To address this, a technique for removing a false contour produced by digital signal processing is disclosed in JP-A-6-62280, for example.

Referring now to the drawings, description is made of a conventional false contour correction circuit which is disclosed in JP-A-6-62280. FIG. 9 is a block diagram showing the configuration of the conventional false contour correction circuit. The false contour correction circuit comprises a random number generator 5, a judgment circuit 6, and an addition circuit 7, and receives an n-bit digital image signal A. A signal F composed of predetermined lower bits out of the n bits composing the inputted digital image signal A is fed to the judgment circuit 6. The random number generator 5 outputs a digital random number H having the same bit width as the bit width of the signal F. The judgment circuit 6 compares a value represented by the signal F composed of the predetermined lower bits of the digital image signal A with the digital random number H outputted from the random number generator 5, and outputs a signal representing "1" or "0" as a correction signal I depending on the results of the comparison. The addition circuit 7 is an adder having the same bit width as that of upper bits G of the digital image signal A, and adds the upper bits G of the digital image signal A and the correction signal I outputted from the judgment circuit 6, to generate a corrected output signal J.

According to the above-mentioned false contour correction circuit, the correction signal I having no regularity is added to the upper bits G of the digital image signal A. Therefore, the signal F composed of the lower bits which are inputted to the judgment circuit 6 out of the n bits composing the digital image signal A and the correction signal I outputted from the judgment circuit 6 are not correlated with each other within the precision of the random number generator 5. In a case where an image which hardly changes in brightness or hue is quantized by thus making a correction having no correlation with the image, the position on a screen where the quantization level changes is dispersed backward, forward, right, and left, so that an unnatural false contour is reduced. Consequently, such a digital image signal after the correction makes it possible to obtain an image whose image quality is prevented from being lowered by quantization whose level is low.

In the conventional false contour correction circuit, the digital image signal is subjected to a variation corresponding to a change in the most significant bit without being correlated with an image so that the position on the screen where the quantization level changes is not correlated with the image signal. Therefore, even when a signal representing an image whose brightness is constant is inputted, an image which contains noises roughing the display on the screen is obtained by the variation of the image signal corresponding to the change in the most significant bit.

Therefore, an object of the present invention is to provide a false contour correcting apparatus capable of reducing a false contour in an image based on a digital image signal while avoiding lowering the image quality by such a side effect or the like caused by false contour correction in which the above-mentioned noises occur.

SUMMARY OF THE INVENTION

A first aspect of the present invention is directed to a false contour correcting apparatus for reducing a false contour in an image based on a digital image signal, comprising:

a double bit change detection circuit for detecting in the digital image signal a signal value change which is twice the minimum quantization unit of the digital image signal as a double bit change and outputting a signal representing the results of the detection as a double bit change detection signal; and a signal correction circuit for subjecting a double bit change portion, which is a portion where the double bit change exists, in the digital image signal to correction for reducing the false contour on the basis of the double bit change detection signal.

According to the first aspect of the present invention, the double bit change in the digital image signal is detected, and the double bit change portion in the digital image signal is subjected to the correction for reducing the false contour. Therefore, it is possible to reduce the false contour while avoiding lowering the image quality by such a side effect or the like in conventional false contour correction where noises occur.

According to a second aspect of the present invention, in the first aspect of the present invention, the signal correction circuit corrects the double bit change portion in the digital image signal into a portion where there exist two one-bit changes each of which is a signal value change corresponding to the minimum quantization unit on the basis of the double bit change detection signal.

According to the second aspect of the present invention, the double bit change in the digital image signal is converted into the two one-bit changes, so that the false contour corresponding to the double bit change is removed or reduced.

According to a third aspect of the present invention, the false contour correcting apparatus in the first aspect of the present invention further comprises a front and rear flatness detection circuit for judging whether or not there exists a signal value change which is not less than twice the minimum quantization unit in predetermined sections before and after the double bit change in the digital image signal, and outputting a signal representing the results of the judgment as a flatness detection signal, the signal correction circuit subjecting, only when there exists no signal value change which is not less than twice the minimum quantization unit in the predetermined sections before and after the double bit change, the double bit change portion to the correction for reducing the false contour on the basis of the flatness detection signal.

According to the third aspect of the present invention, only when there is no change which is not less than the double bit change in the predetermined sections before and after the double bit change in the digital image signal, that is, only when the value of the digital image signal is approximately constant in the predetermined sections, the double bit change is corrected. Therefore, it is possible to reliably correct only the false contour, and prevent an image from being adversely affected by the correction for the false contour.

According to a fourth aspect of the present invention, in the third aspect of the present invention, the predetermined sections are sections respectively corresponding to five adjacent pixels in the digital image signal.

According to a fifth aspect of the present invention, the false contour correcting apparatus in the second aspect of the present invention further comprises a front and rear flatness detection circuit for judging whether or not there exists a signal value change which is not less than twice the minimum quantization unit in predetermined sections before and after the double bit change in the digital image signal, and outputting a signal representing the results of the judgment as a flatness detection signal, the signal correction circuit subjecting, only when there exists no signal value change which is not less than twice the minimum quantization unit in the predetermined sections, the double bit change portion to the correction for reducing the false contour on the basis of the flatness detection signal, and determining the positions of the two one-bit changes such that an interval between the one-bit changes is shorter than the predetermined sections in the correction.

According to the fifth aspect of the present invention, only when there exists no other double bit change in the predetermined sections before and after the double bit change in the digital image signal, the correction is made. The interval between the two one-bit changes produced by the correction is shorter than the predetermined sections. Consequently, correction for one of the two double bit changes existing in the digital image signal does not adversely affect correction for the other double bit change. Therefore, it is possible to also perform false contour correction processing having no erroneous operation with respect to the digital image signal in which the double bit change frequently occurs.

According to a sixth aspect of the present invention, the false contour correcting apparatus in the second aspect of the present invention further comprises a random number generation circuit for generating a random number signal representing a pseudorandom number, the signal correction circuit determining, on the basis of the random number signal, the positions of the two one-bit changes to be produced by the correction for the double bit change portion.

According to the sixth aspect of the present invention, the positions of the two one-bit changes produced by the correction for the double bit change portion in the digital image signal are determined at random on the basis of the random number signal. Therefore, it is possible to prevent such a phenomenon that portions where the one-bit changes respectively exist (hereinafter referred to as one-bit change portions) look like a vertical line upon being longitudinally lined up in an image based on the digital image signal.

According to a seventh aspect of the present invention, in the sixth aspect of the present invention, the random number generation circuit receives a horizontal synchronizing signal corresponding to the digital image signal, and outputs as the random number signal a signal representing a value which varies depending on a horizontal line represented by the horizontal synchronizing signal.

According to the seventh aspect of the present invention, the positions of the two one-bit changes produced by the correction for the double bit change portion in the digital image signal are irregularly shifted right and left for each horizontal line on the basis of the random number signal. Therefore, it is possible to prevent such a phenomenon that the two one-bit change portions look like a vertical line upon being longitudinally lined up in an image based on the digital image signal.

An eighth aspect of the present invention is directed to a false contour correcting apparatus for reducing a false contour in an image based on a digital image signal, comprising:

a change detection circuit for detecting in the digital image signal a signal value change which is not less than twice the minimum quantization unit of the digital image signal, and outputting a signal representing the results of the detection as a change detection signal;

a front and rear flatness detection circuit for judging whether or not there exists a signal value change which is not less than twice the minimum quantization unit in predetermined sections before and after the signal value change detected by the change detection circuit in the digital image signal, and outputting a signal representing the results of the judgment as a flatness detection signal; and a signal correction circuit for subjecting, only when there exists no signal value change which is not less than twice the minimum quantization unit in the predetermined sections, a portion where there exists the signal value change detected by the change detection circuit in the digital image signal to the correction for reducing the false contour on the basis of the change detection signal and the flatness detection signal.

According to the eighth aspect of the present invention, only when the change which is not less than the double bit change in the digital image signal is detected, and the value of the digital image signal is approximately constant in the predetermined sections before and after the double bit change, the portion where there exists the change which is not less than the double bit change in the digital image signal is subjected to the correction for reducing the false contour. Therefore, eve when a change which is not less than three times the minimum quantization unit exists in the digital image signal, and a false contour is produced by the change, the false contour can be reduced.

A ninth aspect of the present invention is directed to a false contour correcting method for reducing a false contour in an image based on a digital image signal, comprising:

a double bit change detecting step of detecting, as a double bit change portion, a portion where the values of adjacent pixels differ by a value which is twice the minimum quantization unit of the digital image signal in an image represented by the digital image signal; and a correcting step of correcting the values of the pixels in the double bit change portion, to reduce the false contour.

According to a tenth aspect of the present invention, in the ninth aspect of the present invention, in the signal correcting step, the values of the pixels in the double bit change portion are corrected on the basis of the results of the detection in the detecting step such that there exist two one-bit change portions, each of the one-bit change portions being defined as a portion where one-bit change exists and the values of the adjacent pixels differ by the minimum quantization unit.

According to an eleventh aspect of the present invention, the false contour correcting method in the ninth aspect of the present invention further comprises a front and rear flatness detecting step of detecting, in the predetermined sections before and after the adjacent pixels in the double bit change portion, whether or not there exist adjacent pixels whose values differ by not less than twice the minimum quantization unit, in the correcting step, the values of the pixels in the double bit change portion being corrected, only when no adjacent pixels whose values differ by not less than twice the minimum quantization unit exits in the predetermined sections, on the basis of the results of the detection in the front and rear flatness detecting step.

According to a twelfth aspect of the present invention, the false contour correcting method in the tenth aspect of the present invention further comprises a front and rear flatness detecting step of detecting, in the predetermined sections before and after the adjacent pixels in the double bit change portion, whether or not there exist adjacent pixels whose values differ by not less than twice the minimum quantization unit, in the correcting step, the values of the pixels in the double bit change portion being corrected, only when no signal value change which is not less than twice the minimum quantization unit exists in the predetermined sections, on the basis of the results of the detection in the front and rear flatness detecting step, and the positions of the two one-bit change portions being determined such that an interval between the one-bit change portions is shorter than the predetermined sections in the correction.

According to a thirteenth aspect of the present invention, the false contour correcting method in the tenth aspect of the present invention further comprises a random number generating step of generating a pseudorandom number, in the correcting step, the positions of the two one-bit change portions to be produced by the correction for the double bit change portion being determined on the basis of the pseudorandom number.

A fourteenth aspect of the present invention is directed to a false contour correcting method for reducing a false contour in an image based on a digital image signal, comprising:

a change detecting step of detecting, in an image represented by the digital image signal, a change portion where the values of adjacent pixels differ by not less than twice the minimum quantization unit of the digital image signal;

a front and rear flatness detecting step of detecting, in predetermined sections before and after the adjacent pixels in the change portion detected in the detecting step, whether or not there exist adjacent pixels whose values differ by not less than twice the minimum quantization unit; and a correcting step of correcting the values of the pixels in the change portion detected in the change detecting step, only when no adjacent pixels whose values differ by not less than twice the minimum quantization unit exist in the predetermined sections, on the basis of the results of the detection in the change detecting step and the results of the detection in the front and rear flatness detecting step, to reduce the false contour.

BRIEF DESCRIPTION OF THE DRAWINGS

FIG. 3 is a block diagram showing the configuration of a false contour correcting apparatus according to a third embodiment of the present invention;

FIGS. 4A to 4C are virtual signal waveform diagrams for explaining the operation of the false contour correcting apparatus according to the first embodiment;

DETAILED DESCRIPTION OF THE INVENTION

In order to describe the present invention in more detail, description is made in accordance with the accompanying drawings.

FIGS. 4A–C are a virtual signal waveform diagrams showing a change in a signal value represented by a digital image signal. In many cases, a quantized digital image signal may be generally in a state where there is a one-bit change, as shown in FIG. 4A, or a state where there is no change. The one-bit change is a signal value change corresponding to the minimum quantization unit. When the number of bits used for assigning gray levels is not less than eight, a step corresponding to the one-bit change in an image displayed on a screen is such that it can hardly be confirmed with the human eyes.

However, a change which is twice the minimum quantization unit (hereinafter referred to as a "double bit change") as shown in FIG. 4B occurs at a time, depending on the contents of digital signal processing to which an image signal is subjected, in a digital image signal A obtained as the result of the digital signal processing. That is, when gray level correction is made by the digital signal processing in order to increase the contrast of an image, for example, the double bit change may, in some cases, occur. In such a case, the double bit change appears as an unnatural false contour in an image based on the digital image signal.

Therefore, in each of the embodiments of the present invention, processing for detecting the double bit change in the digital image signal and reducing the false contour on the basis of the result of the detection is performed. The details of each of the embodiments will be described.

<First Embodiment>

Figure 1:
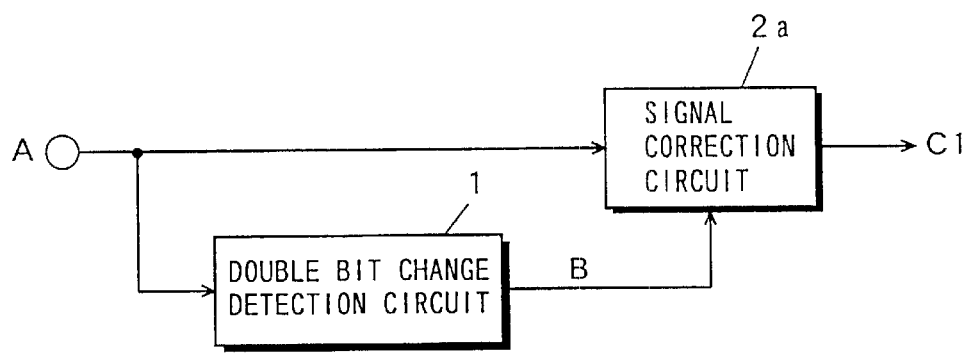
FIG. 1 is a block diagram showing the configuration of a false contour correcting apparatus according to a first embodiment of the present invention.

FIG. 1 is a block diagram showing the configuration of a false contour correcting apparatus according to a first embodiment of the present invention. The false contour correcting apparatus comprises a double bit change detection circuit 1 and a signal correction circuit 2a. A digital image signal A inputted to the false contour correcting apparatus is fed to the double bit change detection circuit 1 and the signal correction circuit 2a.

The double bit change detection circuit 1 detects when there is a difference which is twice the minimum quantization unit (the quantization step size) between adjacent pixels in an image represented by the digital image signal A, that is, there is a difference which is twice a one-bit change between the values of the adjacent pixels, the difference between the values of the pixels as a "double bit change", and outputs a signal representing the results of the detection as a double bit change detection signal B. The double bit change detection circuit 1 can be realized by the same structure as that of a double bit change detection circuit 10 in a false contour correcting apparatus shown in FIG. 7 described later. Considered as the double bit change are a double bit change relating to pixels which are adjacent in the horizontal direction and a double bit change relating to pixels which are adjacent in the vertical direction in the image represented by the digital image signal A. Description is now made considering that the double bit change detection circuit 1 detects the double bit change relating to the pixels which are adjacent in the horizontal direction. However, the double bit change relating to the pixels which are adjacent in the vertical direction will be referred to later.

The signal correction circuit 2a corrects the double bit change in the digital image signal A into changes in two minimum quantization units (hereinafter referred to as "one-bit changes") using the double bit change detection signal B, and outputs the digital image signal which has been subjected to such correction as a corrected image signal C1. The signal correction circuit 2a can be realized by the same structure as that of a signal correction circuit 20 in the false contour correcting apparatus shown in FIG. 7 described later.

The operation of the false contour correcting apparatus according to the present embodiment configured as described above will be described with reference to FIGS. 4A–C.

In the false contour correcting apparatus according to the present embodiment, when the digital image signal A in which there exists a double bit change, as shown in FIG. 4B, is inputted thereto, the double bit change is detected by the double bit change detection circuit 1. In the signal correction circuit 2a, a portion where the double bit change exists (hereinafter referred to as a double bit change portion) in the digital image signal A is converted into two portions where one-bit changes respectively exist (hereinafter referred to as one-bit change portions) using the double bit change detection signal B representing the results of the detection. That is, the digital image signal A is corrected to a signal in which one-bit changes occur in two steps in such a manner that a one-bit change first occurs immediately before the time point where the double bit change occurs, and a one-bit change further occurs after an elapse of a period of four clocks from the time point where the first one-bit change occurs, as shown in FIG. 4C, for example. Note that a period of n clocks (n is a natural number) means a period corresponding to n periods of a clock signal composed of pulses respectively corresponding to pixels, that is, a period corresponding to n pixels.

The double bit change detection circuit 1 in the above-mentioned embodiment does not detect a signal value change exceeding the double bit change, that is, twice the minimum quantization unit. The reason for this is that it is judged that a portion where the signal value change exceeding the double bit change exists in the digital image signal A does not correspond to a false contour but corresponds to a true contour in the image represented by the digital image signal A.

As described in the foregoing, according to the present embodiment, the false contour is detected by detecting the double bit change portion in the digital image signal A, and is removed by decomposing the double bit change portion into the two one-bit change portions. Correction is thus made only for a signal portion corresponding to the false contour, so that the false contour can be reduced while avoiding such a side effect where noises occur in the conventional false contour correction. In the present embodiment, the signal value change exceeding the double bit change in the digital image signal A (the signal value change exceeding twice the minimum quantization unit) is not detected, thereby avoiding subjecting the true contour to false contour correction. Consequently, it is possible to reliably reduce only the false contour while preventing the true contour from being blurred by the false contour correction.

<Second Embodiment>

Figure 2:
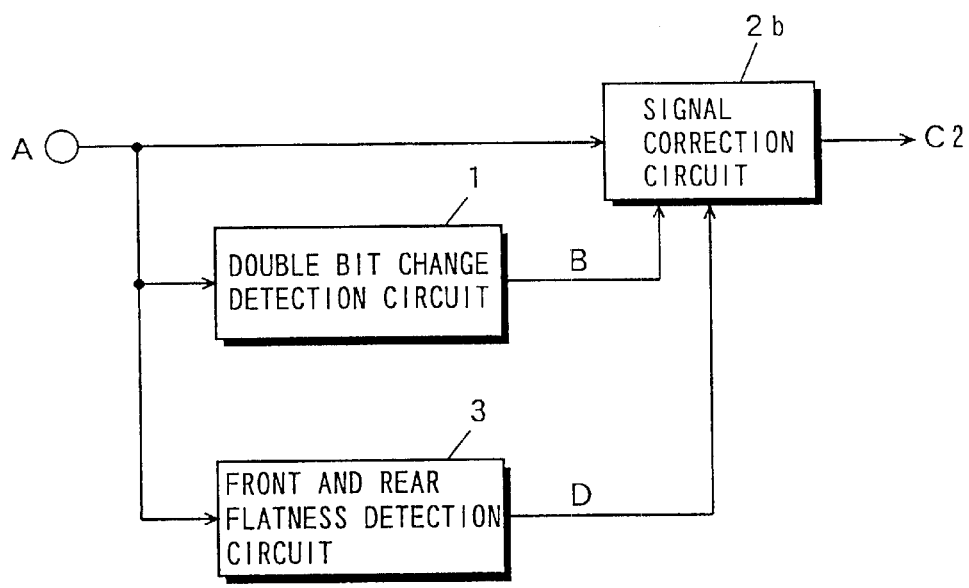
FIG. 2 is a block diagram showing the configuration of a false contour correcting apparatus according to a second embodiment of the present invention.

FIG. 2 is a block diagram showing the configuration of a false contour correcting apparatus according to a second embodiment of the present invention. The false contour correcting apparatus comprises a double bit change detection circuit 1 and a signal correction circuit 2b, as in the first embodiment. The second embodiment differs from the first embodiment in that the false contour correcting apparatus further comprises a front and rear flatness detection circuit 3. In the present embodiment, a digital image signal A inputted to the false contour correcting apparatus is fed to the double bit change detection circuit 1, the signal correction circuit 2b, and the front and rear flatness detection circuit 3.

The function and the structure of the double bit change detection circuit 1 in the present embodiment are the same as those of the double bit change detection circuit 1 in the first embodiment and hence, the description thereof is not repeated.

The front and rear flatness detection circuit 3 detects whether or not the digital image signal A is flat in predetermined periods before and after a double bit change detected by the double bit change detection circuit 1, and outputs the results of the detection as a flatness detection signal D. When the digital image signal A does not include a signal value change which is not less than the double bit change in a predetermined period, that is, is in a state where there is no signal value change or a state where there is a change, which is a one-bit change, the digital image signal A shall be flat in the period. The front and rear flatness detection circuit 3 can be realized by the same structure as that of a front and rear flatness detection circuit 30 in the false contour correcting apparatus shown in FIG. 7 described later.

The signal correction circuit 2b corrects the double bit change in the digital image signal A to two one-bit changes on the basis of a double bit change detection signal B from the double bit change detection circuit 2 and the flatness detection signal D from the front and rear flatness detection circuit 3, and outputs the digital image signal after the correction as a corrected image signal C2. The signal correction circuit 2b can also be realized by the same structure as that of the signal correction circuit 20 in the false contour correcting apparatus shown in FIG. 7 described later.

Figure 5:
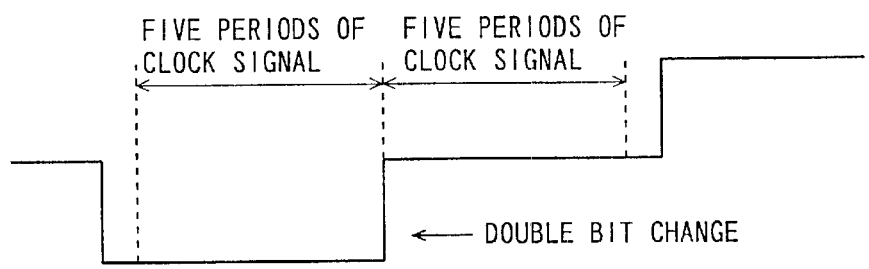
FIG. 5 is a virtual signal waveform diagram for explaining the operation of the false contour correcting apparatus according to the second embodiment.

The operation of the false contour correcting apparatus according to the present embodiment configured as described above will be described with reference to FIG. 5. FIG. 5 is a virtual signal waveform diagram showing an example of a signal value change represented by the digital image signal A.

Also in the present embodiment, the signal correction circuit 2b corrects a double bit change portion in the digital image signal A to two one-bit change portions, as shown in FIG. 4C, using the double bit change detection signal B from the double bit change detection circuit 1, as in the first embodiment. The two one-bit change portions produced in the correction are spaced a period of four clocks apart. If there are a plurality of double bit change portions in the digital image signal A, and an interval between the two double bit change portions is within the period of four clocks, however, correction for one of the two double bit change portions adversely affects correction for the other double bit change portion. That is, in this case, a false contour cannot be suitably corrected in the signal correction circuit 2b. Moreover, when the double bit change portions continuously exist at short intervals in the digital image signal A, it is highly possible that the double bit change portions do not correspond to the false contour. In the present embodiment, a period of five clocks is employed as a value determined by trial-and-error on the assumption that the number of effective pixels in the horizontal direction is 720. When the interval between the two double bit change portions is shorter than the period of five clocks, the two double bit change portions shall not be subjected to correction for reducing the false contour.

From the above-mentioned point of view, in the present embodiment, the front and rear flatness detection circuit 3 detects whether or not the digital image signal A is flat periods of five clocks before and after the double bit change, that is, whether or not there is no change which is not less than the double bit change as shown in FIG. 5, and outputs the results of the detection as the flatness detection signal D. The signal correction circuit 2b corrects, when the double bit change exists in the digital image signal A and the digital image signal A is flat in the periods of five clocks before and after the double bit change, the double bit change portion to two one-bit change portions using the double bit change detection signal B, as well as the flatness detection signal D.

As described in the foregoing, according to the present embodiment, correction for removing a false contour is made only when the double bit change is detected in the digital image signal D, and the digital image signal A is flat in the periods of five clocks before and after the double bit change, while not being made when a plurality of double bit changes exist, and an interval between the two double bit changes is not more than a period of four clocks. Therefore, a digital image signal in which the double bit change frequently occurs can be subjected to false contour correction processing having no erroneous operation. Further, it is possible to subject only the false contour to false contour correction processing in the range in which no adverse effect is exerted by the false contour correction processing.

<Third Embodiment>

FIG. 3 is a block diagram showing the configuration of a false contour correcting apparatus according to a third embodiment of the present invention. The false contour correcting apparatus comprises a double bit change detection circuit 1, a signal correction circuit 2c, and a front and rear flatness detection circuit 3, as in the second embodiment. The third embodiment differs from the second embodiment in that the false contour correcting apparatus further comprises a random number generation circuit 4. In the present embodiment, a digital image signal A inputted to the false contour correcting apparatus is fed to the double bit change detection circuit 1, the signal correction circuit 2c, and the front and rear flatness detection circuit 3, as in the second embodiment.

The functions and the structures of the double bit change detection circuit 1 and the front and rear flatness detection circuit 3 in the present embodiment are respectively the same as those of the double bit change detection circuit 1 and the front and rear flatness detection circuit 3 in the second embodiment and hence, the description thereof is not repeated.

The random number generation circuit 4 generates a random number which is not correlated with the inputted digital image signal A and a corrected image signal C3 which is an output signal, and outputs a random number signal E representing the random number.

The signal correction circuit 2c corrects a double bit change in the digital image signal A to two one-bit changes on the basis of a double bit change detection signal B from the double bit change detection circuit 2, a flatness detection signal D from the front and rear flatness detection circuit 3, and the random number signal E from the random number generation circuit 4, and outputs as the corrected image signal C3 the digital image signal which has been subjected to such correction. The signal correction circuit 2c can also be realized by the same structure as that of the signal correction circuit 20 in the false contour correcting apparatus shown in FIG. 7 described later.

The operation of the false contour correcting apparatus according to the present embodiment configured as described above will be described with reference to FIG. 6.

Also in the present embodiment, the signal correction circuit 2c corrects a double bit change portion in the digital image signal A to two one-bit change portions, as shown in FIG. 4C, using the double bit change detection signal B, as in the second embodiment. When a false contour extends in the vertical direction in an image represented by the digital image signal A, the positions of the two one-bit changes produced in the correction are always identical, as shown in (a) in FIG. 6, in the second embodiment. Therefore, the one-bit change portions after the correction may, in some cases, look like a vertical line upon being longitudinally lined up in the image displayed on a screen depending on the state of the inputted digital image signal A.

Figure 6:
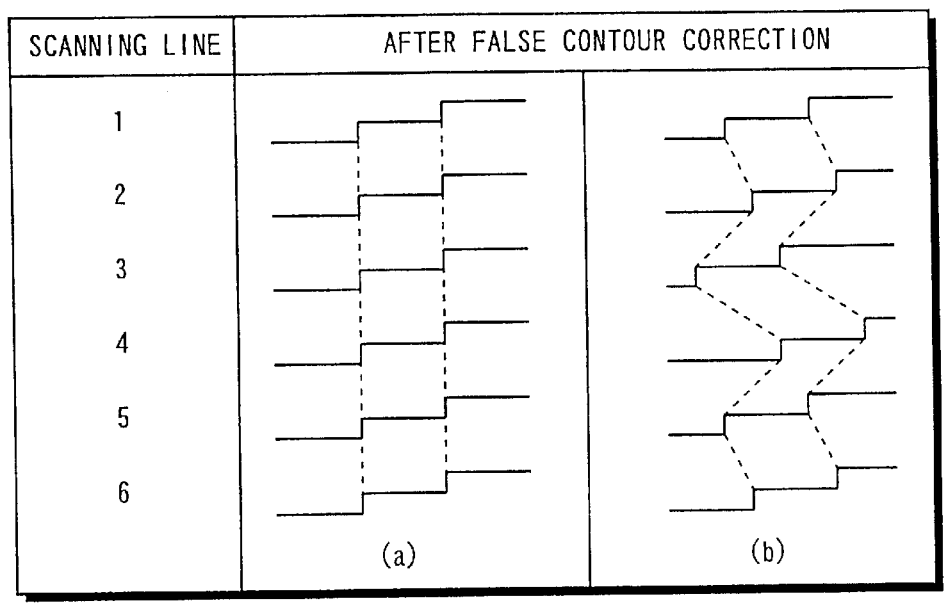
FIG. 6 is a diagram for explaining the operation of the false contour correcting apparatus according to the third embodiment.

In the present embodiment, the positions of the one-bit changes produced by correcting the double bit change portion in the digital image signal A are shifted for each line, as shown in (b) in FIG. 6, using the random number signal E from the random number generation circuit 4. Consequently, it is possible to prevent such a phenomenon that the one-bit change portions produced in the false contour correction look like a vertical line upon being longitudinally lined up in the image displayed on the screen.

Figure 7:
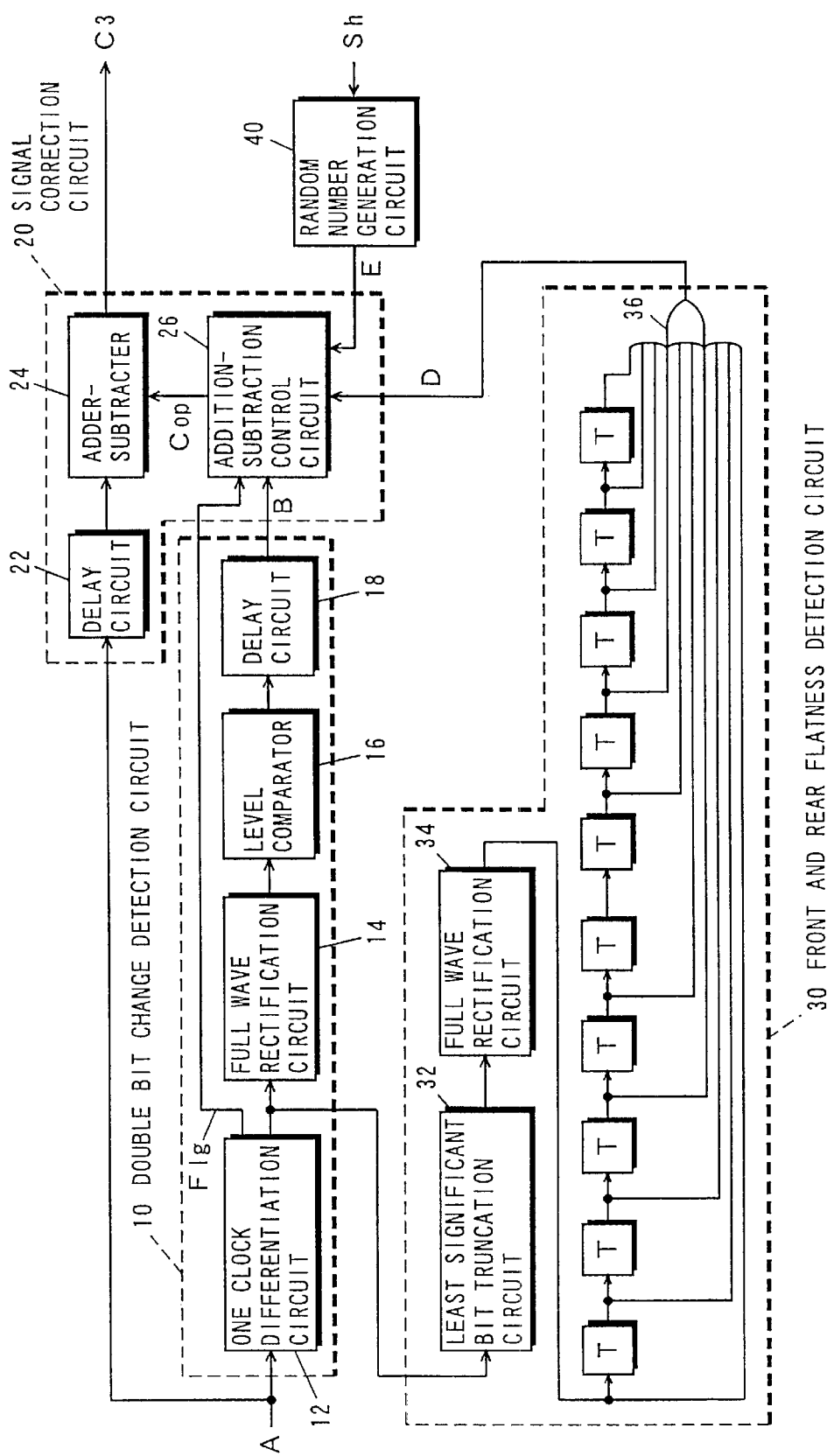
FIG. 7 is a block diagram showing the detailed configuration of the false contour correcting apparatus according to the third embodiment.

FIG. 7 is a detailed block diagram showing an example of the configuration of the false contour correcting apparatus according to the present embodiment. The double bit change detection circuit 1, the signal correction circuit 2c, the front and rear flatness detection circuit 3, and the random number generation circuit 4 shown in FIG. 3 respectively correspond to a double bit change detection circuit 10, a signal correction circuit 20, a front and rear flatness detection circuit 30, and a random number generation circuit 40 shown in FIG. 7.

In the example of the configuration, the double bit change detection circuit 10 is constituted by a one clock differentiation circuit 12, a full wave rectification circuit 14, a level comparator 16, and a delay circuit 18. The one clock differentiation circuit 12 generates as a differentiation signal a signal having a value corresponding to a difference between signal values spaced a period of one clock apart, that is, a difference between the values of adjacent pixels in the digital image signal A, and outputs a flag signal Flg indicating whether the value of the difference is positive or negative. The full wave rectification circuit 14 reverses the polarity of a negative signal portion of the differentiation signal from the one clock differentiation circuit 12, to convert the differentiation signal into a signal having only a positive value, and outputs the signal as a full wave rectification signal. The level comparator 16 compares the value of the full wave rectification signal with a reference value corresponding to a double bit change which is a previously set value, and outputs a digital signal which enters an H level only when the value of the full wave rectification signal is equal to the reference value, while entering an L level in the other cases. The delay circuit 18 outputs a signal obtained by delaying the digital signal by a predetermined number of clocks as a double bit change detection signal B.

The front and rear flatness detection circuit 30 is constituted by a least significant bit truncation circuit 32, a full wave rectification circuit 34, a delay circuit which is a cascade connection of ten one-clock-delay elements T, and an OR circuit 36. The least significant bit truncation circuit 32 receives the differentiation signal from the one clock differentiation circuit 12 in the double bit change detection circuit 10, and outputs a signal obtained by truncating the least significant bit of the differentiation signal. When the inputted differentiation signal is an analog signal, the least significant bit truncation circuit 32 converts the differentiation signal into a digital signal, and truncates the least significant bit of the digital signal. Instead of using the differentiation signal outputted from the one clock differentiation circuit 12, a one clock differentiation circuit may be separately provided in the front and rear flatness detection circuit 30, the digital image signal A may be inputted to the one clock differentiation circuit, and the differentiation signal obtained by the one clock differentiation circuit may be inputted to the least significant bit truncation circuit 32. The signal from the least significant bit truncation circuit 32 is inputted to the delay circuit comprising the ten one-clock-delay elements T through the full wave rectification circuit 34 having the same function as that of the full wave rectification circuit 14 in the double bit change detection circuit 10. The signal inputted to the delay circuit enters an L level when there is no change in the digital image signal A or when there is a change, which is a one-bit change in the digital image signal A, while entering an H level when there is a change which is not less than the double bit change in the digital image signal A. The OR circuit 36 receives an input signal from the delay circuit, an output signal of each of the delay elements T in the first stage to the fourth stage out of the ten delay elements T constituting the delay circuit, and an output signal of each of the delay elements T from the sixth stage to the tenth stage, and outputs a signal representing the logical OR of the signals as a flatness detection signal D. The flatness detection signal D enters, at each of time points in units of clocks, an L level when a signal from the full wave rectification circuit 34 is at an L level in periods of five clocks before and after a time point excluding the time point, while entering an H level in the other cases. Consequently, the flatness detection signal D enters an L level when there is no signal value change in the periods of five clocks before and after the double bit change in the digital image signal A or when there is a change, which is a one-bit change, while entering an H level when there is a change which is not less than the double bit change.

The random number generation circuit 40 may be realized as a circuit for generating a pseudorandom number using a linear feedback shift register or the like. In the example of the configuration, the random number generation circuit 40 is realized by a lookup table for receiving a horizontal synchronizing signal Sh and outputting as a random number signal E a signal representing a value which varies depending on a horizontal line represented by the horizontal synchronizing signal. The lookup table is set so that the position of the one-bit change determined by the random number signal E is spuriously shifted at random for each line, as shown in (b) in FIG. 6, in correcting the double bit change.

The signal correction circuit 20 is constituted by a delay circuit 22, an adder-subtracter 24, and an addition-subtraction control circuit 26. The delay circuit 22 delays the digital image signal A by a predetermined number of clocks, and outputs the digital image signal after the delay. The addition-subtraction control circuit 26 generates a control signal Cop which is composed of an addition instruction signal Cadd and a subtraction instruction signal Csub as a signal for controlling an operation exerted by the adder-subtracter 24 on the basis of the double bit change detection signal B and the flag signal Flg from the double bit change detection circuit 10, the flatness detection signal D from the front and rear flatness detection circuit 30, and the random number signal E from the random number generation circuit 40. The adder-subtracter 24 adds or subtracts a predetermined value to or from the digital image signal after the delay outputted from the delay circuit 22 for a predetermined period depending on the control signal Cop, and outputs the digital image signal after the operation as a corrected image signal C3. The delay circuit 22 in the signal correction circuit 20 and the delay circuit 18 in the double bit change detection circuit 10 are introduced to adjust the timing among the digital image signal A, the double bit change detection signal B, the flatness detection signal D, and so forth in order to realize operations as shown in FIGS. 8A and B described later.

Figure 8A:
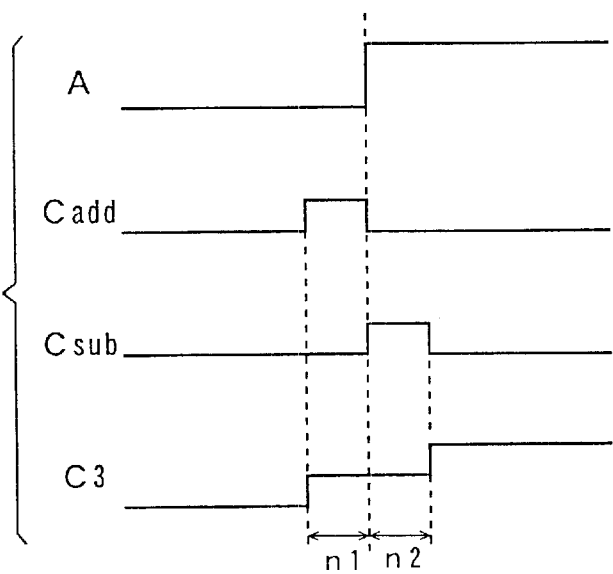
FIGS. 8A and 8B are virtual signal waveform diagrams for explaining the operation of the false contour correcting apparatus shown in FIG. 7.

FIG. 8A is a signal waveform diagram showing an example of one operation of the signal correction circuit 20. FIG. 8A illustrates not an actual signal waveform with respect to the digital image signal A and the corrected image signal C3, but a virtual signal waveform showing signal value changes represented by the digital signals A and C3. When there exists a double bit change in the direction in which the signal value increases in the digital image signal A, as shown in FIG. 8A, the double bit change detection signal B representing the position of the double bit change, as well as the flag signal Flg indicating that the value of the differentiation signal from the one clock differentiation circuit 12 is positive, are inputted to the addition-subtraction control circuit 26. The fact that the flag signal Flg indicates that the value of the differentiation signal is positive means that the double bit change is a change in the direction in which the value of the digital image signal A increases. In this case, the addition instruction signal Cadd in the control signal Cop outputted from the addition-subtraction control circuit 26 becomes active (enters an H level) for only a period of n1 clocks immediately before the time point where the double bit change occurs if the flatness detection signal D is active (is at an L level). On the other hand, the subtraction instruction signal Csub in the control signal Cop becomes active (enters an H level) for only a period of n2 clocks immediately after the time point where the double bit change occurs if the flatness detection signal D is active (is at an L level). The respective values of the numbers of clocks n1 and n2 are determined by the random number signal E. The adder-subtracter 24 adds a value corresponding to the minimum quantization unit (i.e., a value corresponding to the one-bit change) to the value of the digital image signal A while the addition instruction signal Cadd is active, while subtracting the value corresponding to the minimum quantization unit from the value of the digital image signal A while the subtraction instruction signal Csub is active. Consequently, a digital image signal in which a double bit change portion is corrected to two one-bit changes is obtained, as shown in FIG. 8A. The signal is then outputted from the signal correction circuit 20 as the corrected image signal C3. If the flatness detection signal D is inactive, the addition instruction signal Cadd and the subtraction instruction signal Csub are not active. Therefore, when there is another double bit change or a change which is not less than the double bit change in periods of five clocks before and after the double bit change, the double bit change is not subjected to the above-mentioned correction.

Figure 8B:
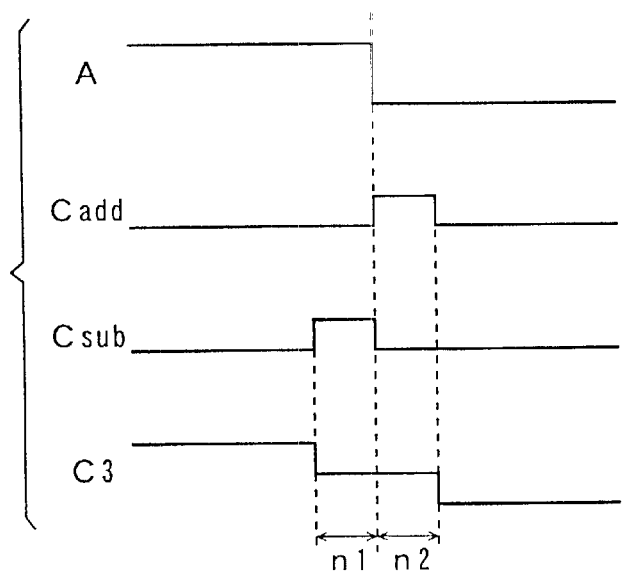
Figure 9:
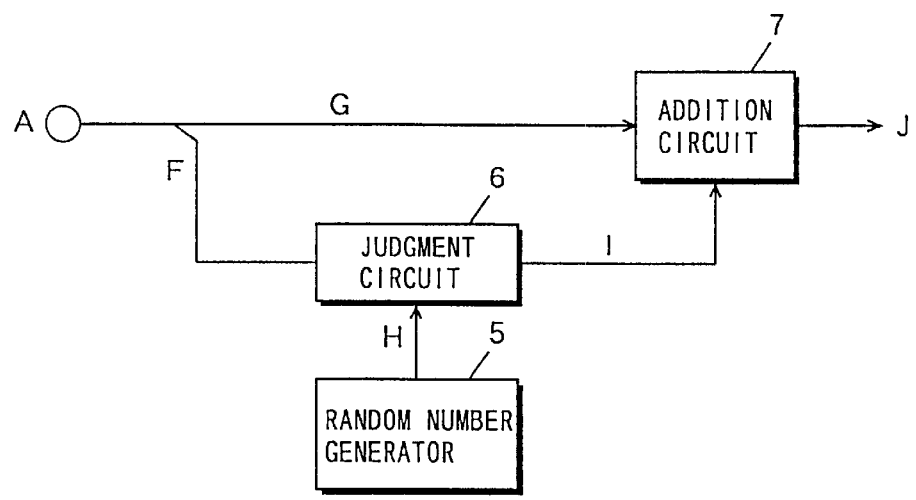
FIG. 9 is a block diagram showing the configuration of a conventional false contour correction circuit.

FIG. 8B is a signal waveform diagram showing an example of another operation of the signal correction circuit 20. FIG. 8B illustrates not an actual signal waveform with respect to the digital image signal A and the corrected image signal C3, but a virtual signal waveform showing signal value changes represented by the digital signals A and C3. When there exists a double bit change in the direction in which the signal value decreases in the digital image signal A, as shown in FIG. 8B, the double bit change detection signal B representing the position of the double bit change, as well as the flag signal Flg indicating that the value of the differentiation signal from the one clock differentiation circuit 12 is negative, are inputted to the addition-subtraction control circuit 26. The fact that the flag signal Flg indicates that the value of the differentiation signal is negative means that the double bit change is a change in the direction in which the value of the digital image signal A decreases. In this case, the subtraction instruction signal Csub in the control signal Cop outputted from the addition-subtraction control circuit 26 becomes active for only a period of n1 clocks immediately before the time point where the double bit change occurs if the flatness detection signal D is active. On the other hand, the addition instruction signal Cadd in the control signal Cop becomes active for only a period of n2 clocks immediately after the time point where the double bit change occurs if the flatness detection signal D is active. The adder-subtracter 24 performs addition and subtraction to and from the digital image signal from the delay circuit 22 on the basis of the subtraction signal Csub and the addition signal Cadd. Consequently, a digital image signal in which a double bit change portion is corrected to two one-bit changes is obtained, as shown in FIG. 8B. The signal is then outputted from the signal correction circuit 20 as the corrected image signal C3. The respective values of the numbers of clocks n1 and n2 are determined by the random number signal E, as described above. When there is another double bit change or a change which is not less than the double bit change in periods of five clocks before and after the double bit change, the flatness detection signal D becomes inactive, so that the double bit change is not subjected to the above-mentioned correction.

By the above-mentioned operations of the signal correction circuit 20, the double bit change in the digital image signal A is corrected to the two one-bit changes, as shown in FIGS. 8A and 8B. That is, the double bit change is decomposed into a one-bit change n1 clocks before the time point where the double bit change occurs and a one-bit change n2 clocks after the time point where the double bit change occurs. When there is another double bit change or a change which is not less than the double bit change in the periods of five clocks before and after the double bit change, the double bit change is not corrected. Since n1 and n2 are determined by the random number signal E, the positions of the two one-bit changes produced by correction for the double bit change, that is, false contour correction are shifted for each line, as shown in (b) in FIG. 6.

As described in the foregoing, according to the present embodiment, it is possible to obtain the same effects as those of the first and second embodiments, and to prevent such a phenomenon that the one-bit change portions produced in the false contour correction look like a vertical line upon being longitudinally lined up in an image displayed on a screen.

<Modified Example>

As described in the foregoing, although in each of the above-mentioned embodiments an interval between the two one-bit changes produced by correction for the double bit change in the digital image signal A shall be a period of four clocks as shown in FIG. 4C, the interval is not limited to the period of four clocks. For example, the interval may be a period of not less than two clocks.

Although the front and rear flatness detection circuit 3 used in the second and third embodiments detects whether the digital image signal A is flat in the periods of five clocks before and after the double bit change, the period during which whether the digital image signal is flat is detected, before and after the double bit change (this period is hereinafter referred to as a "flat" period), is not limited to the periods of five clocks. A suitable length of the flat period depends on how long an interval should be between two double bit changes existing in the digital image signal to judge that the double bit changes correspond to false contours. For example, an image represented by the digital image signal is statistically investigated, thereby making it possible to determine a suitable length as the flat period depending on the number of pixels in the horizontal direction in the image. As already described, the flat period must be longer than the interval between the two one-bit changes produced by correction for the double bit change (the period of four clocks in each of the above-mentioned embodiments) in order to make false contour correction having no erroneous operation.

Furthermore, while the false contour correcting apparatus according to each of the above-mentioned embodiments can be used as an apparatus for subjecting the digital image signal sent in real time, for example, an image signal in a television receiver, to false contour correction processing, it can be also used in performing false contour correction processing as image processing for stored image data. That is, it is also possible to use the false contour correcting apparatus according to each of the embodiments by considering an image signal obtained by successively reading out image data stored in a storage device, such as a semiconductor memory or a hard disk device, as the digital image signal A in the embodiment.

Furthermore, while in each of the embodiments, the double bit change relating to pixels which are adjacent in the horizontal direction is detected, the double bit change relating to pixels which are adjacent in the vertical direction may be detected in order to remove a false contour extending in the horizontal direction. When the double bit change relating to the pixels which are adjacent in the vertical direction is detected, to correct the false contour, processing for each clock in each of components may be changed into processing for each line in the false contour correcting apparatus shown in FIG. 7, for example, in such a manner that the one clock differentiation circuit 12 is replaced with a one line differentiation circuit for generating as a differentiation signal, a signal having a value corresponding to a difference between signal values which are spaced a period corresponding to one line in the digital image signal A, and each of the one-clock-delay elements T in the front and rear flatness detection circuit 30 is replaced with a one-line-delay element.

In the embodiments and the modified example described above, the double bit change detection circuit 1 detects only the double bit change in the digital image signal A (or the adjacent pixels which differ only by a value which is twice the minimum quantization unit) on the assumption that a portion where there is a signal value change exceeding the double bit change in the digital image signal A does not correspond to a false contour. However, when a signal value change which is not less than three times the minimum quantization unit, that is, a signal value change which is not less than a triple bit change occurs by digital signal processing to which the digital image signal A is subjected, and such a signal value change appears as a false contour in the display on a screen, not only the double bit change, but also the signal value change which is not less than the triple bit change may be detected to make a correction for reducing the false contour on the basis of the results of the detection. To attain this, the level comparator 16 in the false contour correcting apparatus shown in FIG. 7, for example, may be modified so as to output a digital signal being at an H level when the value of the full wave rectification signal is not less than the reference value and being at an L level otherwise. In this case, correction for a signal value change which is not less than the double bit change, which does not correspond to the false contour, is avoided by the front and rear flatness detection circuit 30.

INDUSTRIAL APPLICABILITY

The present invention is applied to a false contour correcting apparatus for reducing a false contour in an image based on a digitized image signal. For example, the present invention is suitable for a false contour correction circuit for subjecting a digital image signal in a television receiver to signal processing for removing a false contour. Further, it is also applicable to an apparatus for correcting a false contour as image processing for image data stored in a storage device.

What is claimed is:

1. A false contour correcting apparatus for reducing a false contour in an image based on a digital image signal, said false contour correcting apparatus comprising:
   a double bit change detection circuit for detecting in the digital image signal, a signal value change which is twice a minimum quantization unit of the digital image signal as a double bit change, and outputting a signal representing results of the detection as a double bit change detection signal;
   a signal correction circuit for correcting a double bit change portion, which is a portion where the double bit change exists, in the digital image signal to reduce the false contour based on the double bit change detection signal; and
   a front and rear flatness detection circuit for judging whether or not there exists a signal value change which is not less than twice the minimum quantization unit in predetermined sections before and after the double bit change in the digital image signal, and outputting a signal representing results of the judgment as a flatness detection signal, wherein
   said signal correction circuit corrects, only when there exists no signal value change which is not less than twice the minimum quantization unit in the predetermined sections before and after the double bit change, the double bit change portion to reduce the false contour based on the flatness detection signal.

2. The false contour correcting apparatus according to claim 1, wherein
   the predetermined sections are sections respectively corresponding to five adjacent pixels in the digital image signal.

3. A false contour correcting apparatus for reducing a false contour in an image based on a digital image signal, said false contour correcting apparatus comprising:
   a double bit change detection circuit for detecting in the digital image signal, a signal value change which is twice a minimum quantization unit of the digital image signal as a double bit change, and outputting a signal representing results of the detection as a double bit change detection signal;
   a signal correction circuit for correcting a double bit change portion, which is a portion where the double bit change exists, in the digital image signal to reduce the false contour based on the double bit change detection signal; and
   a front and rear flatness detection circuit for judging whether or not there exists a signal value change which is not less than twice the minimum quantization unit in predetermined sections before and after the double bit change in the digital image signal, and outputting a signal representing results of the judgment as a flatness detection signal,
   wherein said signal correction circuit corrects the double bit change portion in the digital image signal into a portion where there exists two one-bit changes each of which is a signal value change corresponding to the minimum quantization unit based on the double bit change detection signal, and
   wherein said signal correction circuit corrects, only when there exists no signal value change which is not less than twice the minimum quantization unit in the predetermined sections, the double bit change portion to reduce the false contour based on the flatness detection signal, and determines positions of the two one-bit changes such that an interval between the two one-bit changes is shorter than the predetermined sections in the correction.

4. A false contour correcting apparatus for reducing a false contour in an image based on a digital image signal, said false contour correcting apparatus comprising:
   a double bit change detection circuit for detecting in the digital image signal, a signal value change which is twice a minimum quantization unit of the digital image signal as a double bit chance, and outputting a signal representing results of the detection as a double bit change detection signal;
   a signal correction circuit for correcting a double bit change portion, which is a portion where the double bit change exists, in the digital image signal to reduce the false contour based on the double bit change detection signal; and
   a random number generation circuit for generating a random number signal representing a pseudorandom number,
   wherein said signal correction circuit corrects the double bit change portion in the digital image signal into a portion where there exists two one-bit changes each of which is a signal value change corresponding to the minimum quantization unit based on the double bit change detection signal, and
   wherein said signal correction circuit determines, based on the random number signal, positions of the two one-bit changes to be produced by correcting the double bit change portion.

5. The false contour correcting apparatus according to claim 4, wherein said random number generation circuit receives a horizontal synchronizing signal corresponding to the digital image signal, and outputs as the random number signal, a signal representing a value which varies depending on a horizontal line represented by the horizontal synchronizing signal.

6. A false contour correcting apparatus for reducing a false contour in an image based on a digital image signal, said false contour correcting apparatus comprising:

a change detection circuit for detecting in the digital image signal, a signal value change which is not less than twice a minimum quantization unit of the digital image signal, and outputting a signal representing results of the detection as a change detection signal;

a front and rear flatness detection circuit for judging whether or not there exists a signal value change which is not less than twice the minimum quantization unit in predetermined sections before and after the signal value change detected by said change detection circuit in the digital image signal, and outputting a signal representing results of the judgment as a flatness detection signal; and a signal correction circuit for correcting, only when there exists no signal value change which is not less than twice the minimum quantization unit in the predetermined sections, a portion where there exists the signal value change detected by said change detection circuit in the digital image signal to reduce the false contour based on the change detection signal and the flatness detection signal.

7. A false contour correcting method for reducing a false contour in an image based on a digital image signal, said false contour correcting method comprising:

a double bit change detecting operation of detecting, as a double bit change portion, a portion where values of adjacent pixels differ by a value which is twice a minimum quantization unit of the digital image signal in an image represented by the digital image signal;

a correcting operation of correcting the values of the pixels in the double bit change portion, to reduce the false contour; and a front and rear flatness detecting operation of detecting, in predetermined sections before and after the adjacent pixels in the double bit change portion, whether or not there exist adjacent pixels whose values differ by not less than twice the minimum quantization unit, wherein said correcting operation comprises correcting the values of the pixels in the double bit change portion, only when no adjacent pixels whose values differ by not less than twice the minimum quantization unit exist in the predetermined sections, based on results of the detection in said front and rear flatness detecting operation.

8. A false contour correcting method for reducing a false contour in an image based on a digital image signal, said false contour correcting method comprising:

a double bit change detecting operation of detecting, as a double bit change portion, a portion where values of adjacent pixels differ by a value which is twice a minimum quantization unit of the digital image signal in an image represented by the digital image signal;

a correcting operation of correcting the values of the pixels in the double bit change portion, to reduce the false contour; and a front and rear flatness detecting operation of detecting, in predetermined sections before and after the adjacent pixels in the double bit change portion, whether or not there exist adjacent pixels whose values differ by not less than twice the minimum quantization unit, wherein said correcting operation comprises correcting the values of the pixels in the double bit change portion based on results of the detection in said detecting operation such that there exists two one-bit change portions, each of the two one-bit change portions being defined as a portion where a one-bit change exists and the values of the adjacent pixels differ by the minimum quantization unit, and wherein said correcting operation comprises correcting the values of the pixels in the double bit change portion, only when no signal value change which is not less than twice the minimum quantization unit exists in predetermined sections, based on results of the detection in said front and rear flatness detecting operation, and positions of the two one-bit change portions being determined such that an interval between the two one-bit change portions is shorter than the predetermined sections in the correction.

9. A false contour correcting method for reducing a false contour in an image based on a digital image signal, said false contour correcting method comprising:

a double bit change detecting operation of detecting, as a double bit change portion, a portion where values of adjacent pixels differ by a value which is twice a minimum quantization unit of the digital image signal in an image represented by the digital image signal;

a correcting operation of correcting the values of the pixels in the double bit change portion, to reduce the false contour; and a random number generating operation of generating a pseudorandom number, wherein said correcting operation comprises correcting the values of the pixels in the double bit change portion based on results of the detection in said detecting operation such that there exists two one-bit change portions, each of the two one-bit change portions being defined as a portion where a one-bit change exists and the values of the adjacent pixels differ by the minimum quantization unit, and wherein in said correcting operation, positions of said two one-bit change portions to be produced by correcting the double bit change portion are determined based on the pseudorandom number.

10. A false contour correcting method for reducing a false contour in an image based on a digital image signal, said false contour correcting method comprising:

a change detecting operation of detecting, in an image represented by the digital image signal, a change portion where values of adjacent pixels differ by not less than twice a minimum quantization unit of the digital image signal;

a front and rear flatness detecting operation of detecting, in predetermined sections before and after the adjacent pixels in the change portion detected in said change detecting operation, whether or not there exist adjacent pixels whose values differ by not less than twice the minimum quantization unit; and a correcting operation of correcting the values of the pixels in the change portion detected in said change detecting operation, only when no adjacent pixels whose values differ by not less than twice the minimum quantization unit exist in the predetermined sections, based on results of the detection in said change detecting operation and results of the detection in said front and rear flatness detecting operation, to reduce the false contour.

* * * * *